(12) United States Patent
Henderson et al.

(10) Patent No.: US 6,801,160 B2
(45) Date of Patent: Oct. 5, 2004

(54) DYNAMIC MULTI-BEAM ANTENNA USING DIELECTRICALLY TUNABLE PHASE SHIFTERS

(76) Inventors: Herbert Jefferson Henderson, 551 Greencrest La., Odenton, MD (US) 21023; Vincent G. Karasack, 8806 Autumn Hill Ct., Ellicott City, MD (US) 21043; Cornelius Frederik du Toit, 9941 Frederick Rd., Ellicott City, MD (US) 21042

( * ) Notice: Subject to any disclaimer, the term of this patent is extended or adjusted under 35 U.S.C. 154(b) by 0 days.

(21) Appl. No.: 10/226,746

(22) Filed: Aug. 23, 2002

(65) Prior Publication Data

US 2003/0038748 A1 Feb. 27, 2003

Related U.S. Application Data

(60) Provisional application No. 60/315,199, filed on Aug. 27, 2001.

(51) Int. Cl.[7] .................................................. H01Q 3/26
(52) U.S. Cl. ...................................... 342/373; 342/372
(58) Field of Search .......................... 342/81, 154, 158, 342/371, 372, 373

(56) References Cited

U.S. PATENT DOCUMENTS

| 5,212,463 A | 5/1993 | Babbitt et al. |
| 5,409,889 A | 4/1995 | Das |
| 5,427,988 A | 6/1995 | Sengupta et al. |
| 5,635,433 A | 6/1997 | Sengupta |
| 5,635,434 A | 6/1997 | Sengupta |
| 5,693,429 A | 12/1997 | Sengupta et al. |
| 5,766,697 A | 6/1998 | Sengupta et al. |
| 5,830,591 A | 11/1998 | Sengupta et al. |
| 5,846,893 A | 12/1998 | Sengupta et al. |
| 6,074,971 A | 6/2000 | Chiu et al. |
| 6,611,230 B2 * | 8/2003 | Phelan ........................ 342/373 |
| 6,621,465 B2 * | 9/2003 | Teillet et al. ................ 343/797 |
| 6,653,985 B2 * | 11/2003 | Sikina et al. ................ 343/853 |

FOREIGN PATENT DOCUMENTS

| EP | 0 939 452 A2 | 1/1999 |
| EP | 1 045 473 A2 | 10/2000 |
| WO | WO 99/26441 A1 | 5/1999 |
| WO | WO 99/52181 A2 | 10/1999 |

OTHER PUBLICATIONS

PCT International Search Report for International Application No. PCT/US 02/27109; filed Aug. 26, 2002; report maiiled Dec. 5, 2002.

\* cited by examiner

*Primary Examiner*—Dao Phan
(74) *Attorney, Agent, or Firm*—Law Offices of Donald D. Mondul

(57) ABSTRACT

An electronic scanning antenna system configured for beam scanning operation includes a plurality of antenna modules, each respective antenna module including: (a) a plurality of antenna elements arranged in a plurality of element sets, the plurality of element sets being arranged in a plurality of columns; (b) a plurality of beam forming network devices coupled with the plurality of antenna elements, each respective beam forming network device including at least one tunable dielectric phase shifter unit; and (c) at least one control unit coupled with the plurality of beam forming network devices, each control unit controlling the plurality of beam forming network devices to configure signals to operate the plurality of antenna elements to effect the beam scanning operation.

14 Claims, 5 Drawing Sheets

DYNAMIC MULTI-BEAM ANTENNA USING DIELECTRICALLY TUNABLE PHASE SHIFTERS

This application claims benefit of prior filed copending Provisional Patent Application Ser. No. 60/315,199, filed Aug. 27, 2001.

FIELD OF THE INVENTION

This invention relates to antennas, and more particularly to phased array antennas.

BACKGROUND OF THE INVENTION

The broad popularity and ever increasing demand for mobile communication services has given rise to many techniques and innovations geared toward increasing the capacity and communication quality of wireless networks. A wireless mobile network includes one or more base stations spread over a coverage region and a group of mobile subscribers such as cellular phone users. A base station provides a local link between the mobile subscribers and a traditional telephone line. In this context, capacity is the amount of information (i.e., number of bits) that can be exchanged in a given unit of time (or per unit bandwidth) in a given area. In more simplistic terms, the capacity of a wireless network dictates the maximum number of simultaneous wireless telephone conversations that can take place in a given geographical region.

Traditionally, subscribers communicating with the same base station have been differentiated from one another by frequency, as in FDMA (frequency division multiple access); by time, as in TDMA (time division multiple access); or by code, as in CDMA (code division multiple access). A traditional base station antenna broadcasts signals in a fixed direction covering a fixed, broad sector. In such a case, most of the energy is wasted, never reaching a subscriber. Furthermore, given a fixed, broad beam antenna, it is not possible to take advantage of the fact that subscribers in a given region are spatially diverse (i.e., their angular direction with respect to the nearest base station is different).

More recently, "smart antennas" have been introduced as a means of increasing capacity. For purposes of discussion herein, a "smart antenna" is any antenna that is capable of controlling the direction of its transmitted energy or the direction from which it receives energy. Throughout this description, it should be kept in mind that discussions relating to transmitting or transmissions apply with equal veracity to reception of electromagnetic energy or signals. In order to avoid prolixity, the present description will focus primarily on transmission characteristics of antennas, with the proviso that it is understood that reception of energy or signals is also inherently described. Smart antennas have been used in many applications over the years including phased array radar systems and in other communication systems. However, until recently, the use of "smart antennas" as a building block in a mobile communication network has been prohibitively expensive.

One proposed form of "smart antenna" is used in conjunction with digital beam forming techniques. Such an antenna includes multiple radiating columns with energy being received (or transmitted) through each column. By applying amplitude weights to the energy passing through each column the resulting radiation pattern can be very specifically tailored so that significantly more signal is transmitted or received in, or from, certain angular directions relative to other angular directions. Another way to state this is that by applying appropriate amplitude weights to the energy passing through each column, pattern nulls can be created at specific angular directions while other angular directions benefit from the full antenna gain. This ability to steer pattern nulls is useful, for example, when a given communications system is operating at what would otherwise be its full capacity.

A simplified example focusing on two subscribers competing for the same conventional channel in a TDMA system will be presented here. A conventional channel is defined as the unique combination of a carrier frequency (one of 126) and a time slot. If all conventional channels in a given sector are used up, any additional request for service must either be denied or placed on a channel that is already in use by another subscriber. Without a smart antenna, two subscribers on the same channel would immediately become interference for one another. In such a case neither would be able to communicate effectively with the base station. However, by using a null steering smart antenna it is possible to take advantage of spatial diversity and create additional channels. These additional channels are known as space division multiple access (SDMA) channels. To create such a channel the base station radio communicating with the first subscriber places a null on the second subscriber to attenuate the interfering signal. Likewise, the base station antenna communicating with the second subscriber must place a null on the first subscriber. In doing so, two independent, SDMA channels are created permitting reuse of the existing FDMA and TDMA channels. This null steering takes place very quickly (in tens of microseconds) and is synchronized with ongoing communications protocols. In this example two "smart antennas" located at the same base station essentially carve out two spatially discriminated channels permitting two users in the same area (or cell) to share a single conventional channel.

The principle illustrated in the above example is simplified in order to facilitate understanding the invention, and fails to address some of the realities that may significantly limit the utility of adding null steering capability to a mobile communication network. One such limiting reality is signal spreading. Signal spreading refers to the fact that the received communication signal in a mobile network may arrive at a base station (for example) from many different angles. Signal spreading results because radio frequency energy naturally follows all available reflection paths between a mobile subscriber and a base station (this is commonly referred to as "multi-path" propagation, or simply "multi-path"). To make matters worse, the angle from which the strongest signal arrives is not necessarily constant and, in fact, may change very rapidly as a function of time. Thus, because of signal spreading, a single spatially narrow null will not always provide enough isolation to create an independent channel. Furthermore, even if a spatial channel can be created at times, it is not possible to guarantee that the channel can be maintained continuously. This is because the signal-spreading signature changes rapidly as subscribers move and as other objects in the physical channel move. Given enough angular separation between signals, it may be possible to detect and compensate for all of these changes in real time and realize spatially independent channels. However, in general, multi-path effects will tend to significantly limit this otherwise theoretically clean method of significantly improving capacity using SDMA. And in any event, the null steering and angle of arrival algorithms required to actually realize capacity improvements are very computationally intense. Such algorithms are very costly to develop, require significant hardware upgrades for implementation in today's networks, and also require significant computer resources.

High costs and other uncertainties associated with digital beam forming have provided impetus for developing lower cost measures for exploiting spatial subscriber diversity. One such measure includes dividing a broad sector into multiple fixed sectors. An independent fixed antenna with a narrower beam is then used to service each of the smaller sectors. Each sectored beam originates from an independent aperture at the base station. An antenna with a narrower beam has more gain and is not as susceptible to interference as a broad beam antenna. Thus, the use of a narrow beam improves both the signal to noise ratio and the signal to interference ratio (sometimes referred to as "carrier to interference ratio" in telecommunication systems) within the network. In most cases, mobile communication networks are interference limited. Thus, an improved signal to interference ratio can be exploited to increase network capacity. A typical mobile communications network is divided into many cells with frequencies being re-used among cells. Use of the same frequencies in adjacent cells is avoided to avoid interference between cells. Two cells are able to re-use the same frequency they are sufficiently geographically separated. This is the case because as radio frequency energy propagates through the atmosphere it becomes attenuated. Such attenuation is known as propagation loss. After a sufficient distance the power in an interference signal from one cell is guaranteed to be low enough so that it does not create a problem in the cell of interest. Narrow, sectored beams inherently experience less interference. This means that less allowance for propagation loss is needed in frequency planning in order to guarantee an adequate signal to interference ratio. If less allowance for propagation loss is needed, more frequencies are available for reuse among cells, and planning to avoid inter-cell interference is less stringent so that frequency reuse among cells is more easily accommodated. The focused nature of narrow beam systems also means that separations among frequencies in a particular cell may be reduced without contributing to interference between adjacent frequencies. This translates into what is known as a more dense frequency re-use pattern and increases overall network capacity. The increased capacity arises because a fixed number of conventional frequency channels can be re-used more times in the same geographical region.

The use of fixed, sector beam antennas is certainly more cost effective than antennas based on digital beam forming. However, because the beams are fixed, their potential to improve quality and capacity is limited. The beam width of a fixed antenna cannot adapt to changing conditions as would otherwise be required to maintain an optimal signal to interference ratio. Furthermore, a fixed beam provides less gain to a given subscriber who happens to be positioned near the edge of the beam. This is the case because, by definition, antenna gain decreases by 3 dB at the beam edges.

Sectored antennas are cost effective but their ability to exploit spatial diversity is limited because the associated beams are fixed. The digital beam-forming antenna described above operates by radiating energy over a wide angular sector and placing nulls at specific points to minimize unwanted interferers. Multiple nulls are often required, and each null must then be steered to track the interfering subscribers. Steering multiple nulls in real time leads to a high degree of computational intensity. An alternate approach to null steering is to radiate energy in a focused, scanning beam with no nulls, pointing the beam directly at the subscriber to be communicated with. In such a narrow scanning beam system, the beam itself is steered to track a subscriber instead of using a broad fixed beam and steering nulls to track interfering subscribers. A narrow scanning beam system offers two principal advantages. First, because the beam is focused, it has higher gain. This is advantageous because it increases signal power (thereby increasing the signal to noise ratio) creating a more robust communication channel. Second, because each narrow beam antenna must track the location of no more than one subscriber at a time, the computational intensity is reduced as compared with a broad fixed beam system.

A significant reason for the growing interest in smart antennas is the potential for increased capacity and quality. In densely populated areas mobile systems are normally interference-limited, meaning that interference from other users is the main source of noise in the system. This means that the signal to interference ratio, SIR, is much larger than the signal to noise-ratio, SNR. Smart antennas (by employing a narrow focused beam) operate to increase the useful received signal level while also reducing adverse effects of interference. A smart antenna based on a narrow, scanning beam is more directive than a conventional wide beam antenna and this contributes to increased range. Increased range means that base stations can be spaced further apart leading to reductions in total deployment costs. This is particularly advantageous in emerging markets where new infrastructure is still being created. Still another advantage of smart antennas is the possibility of introducing additional services. A smart antenna provides the base station with a means of determining subscriber position. Positioning can be used in services such as emergency calls and location-specific billing.

The communication quality provided by a mobile network can be indicated using several measures. An important measure is clarity of communication (i.e., the percentage of a conversation during which two people communicating over the network understand each other). Another measure is the frequency at which communication is unintentionally interrupted or terminated.

This invention seeks to provide antennas for use in mobile communications networks that can improve the communication quality provided by the networks.

SUMMARY OF THE INVENTION

An electronic scanning antenna system configured for beam scanning operation includes a plurality of antenna modules, each respective antenna module including: (a) a plurality of antenna elements arranged in a plurality of element sets, the plurality of element sets being arranged in a plurality of columns; (b) a plurality of beam forming network devices coupled with the plurality of antenna elements, each respective beam forming network device including at least one tunable dielectric phase shifter unit; and (c) at least one control unit coupled with the plurality of beam forming network devices, each control unit controlling the plurality of beam forming network devices to configure signals to operate the plurality of antenna elements to effect the beam scanning operation.

An electronic scanning antenna includes a plurality of columns of radiating elements for forming a plurality of beams, a beam forming network including a plurality of tunable dielectric phase shifters coupled to the radiating elements, and a controller for controlling a phase shift of the tunable dielectric phase shifters to adjust a beam pointing angle of at least one of the plurality of beams and to adjust a beam width of at least one of the plurality of beams.

The tunable dielectric phase shifters are preferably mounted in a plurality of manifolds with each of the manifolds being coupled to a plurality of the columns of radiating elements. A plurality of low noise amplifiers can be included, with each of the low noise amplifiers being connected between each column of radiating elements and the plurality of manifolds. The antenna can further include a plurality of band pass filters, each of the band pass filters being connected in series with each low noise amplifier.

The controller can include a direction of arrival processor, a beam pointing/beam width processor, and a phase shift controller for producing a phase shift control signal in response to a signal produced by the direction of arrival processor and the beam pointing/beam width controller. The direction of arrival processor produces a control signal in response to a signal to interference ratio produced by a base station receiver. The beam pointing/beam width processor produces a control signal for pointing the beam and for controlling the beam width in response to a framing/frequency-hopping schedule generated by the base station receiver and in response to a direction of arrival signal from the direction of arrival processor.

The controller further includes means for supplying control voltages to the phase shifters. The control voltages control the phase shift provided by the phase shifters as required for beam scanning and beam width control. Beam scanning and beam width control are then used by the direction of arrival processor to maximize the signal to interference ratio. The radiating elements can comprise dual polarized radiating elements to further enhance signal to interference ratios by exploiting polarization diversity.

The invention also encompasses an electronic scanning antenna system comprising a first plurality of columns of radiating elements for forming a first plurality of beams, a first beam forming network including a first plurality of tunable dielectric phase shifters coupled to the first plurality of columns of radiating elements, a first controller for controlling a phase shift of the first plurality of tunable dielectric phase shifters to adjust a beam pointing angle of at least one of the first plurality of beams and to adjust a beam width of at least one of the first plurality of beams, a second plurality of columns of radiating elements for forming a second plurality of beams, a second beam forming network including a second plurality of tunable dielectric phase shifters coupled to the second plurality of columns of radiating elements, and a second controller for controlling a phase shift of the second plurality of tunable dielectric phase shifters to adjust a beam pointing angle of at least one of the second plurality of beams and to adjust a beam width of at least one of the second plurality of beams.

The first controller can comprise means for monitoring a signal to interference ratio of a received signal, and means for supplying control voltages to the first plurality of phase shifters to control a phase shift provided by those phase shifters to maximize the signal to interference ratio.

The invention also encompasses a multi-beam antenna comprising a plurality of one dimensional, electronically scanning apertures, each of the apertures including a plurality of radiating elements receptive to both vertically polarized and horizontally polarized radio frequency energy, an independent bank of tunable dielectric phase shifters coupled to the radiating elements for each polarization, an independent combining/dividing network for each polarization, and an independent voltage control circuit for each tunable dielectric phase shifter.

The apertures can include means for connection to a neighboring aperture. Each of the apertures in the array can operate simultaneously while any other set of apertures in the same array is operating. The antenna can operate in the 1 to 2 GHz frequency band servicing mobile communications subscribers.

Each of the apertures can utilize a substantially planar topology and incorporate dielectrically tunable phase shifters. Each of the apertures can include a combining/dividing network comprising radio frequency circuitry on a plurality of closely stacked, vertically disposed layers.

The dielectrically tunable phase shifters, control circuitry for the phase shifters, and the voltage control lines connecting the phase shifters to the control circuitry can be arranged substantially on the same plane as the associated combining/dividing network, or on one or more planes of a multi-layer structure closely spaced apart from the associated combining/dividing network. In other words, the electronic control circuitry can be integrated with the RF circuitry on the same physical carrier medium.

The invention additionally encompasses a multi-beam antenna comprising a plurality of electronically scanning apertures, each of the apertures including a plurality of radiating elements, an independent bank of dielectrically tunable phase shifters, and at least one combining/dividing network, and an independent voltage control circuit for each dielectrically tunable phase shifter, an independent central processing unit for computing phase shifter control commands as required to realize electronic beam steering.

In another aspect, the invention additionally encompasses a multi-beam antenna with centralized beam computational hardware comprising a plurality of one dimensional, electronically scanning apertures, each of the apertures including a plurality of radiating elements receptive to both vertically polarized and horizontally polarized radio frequency energy, an independent bank of dielectrically tunable phase shifters for each polarization, an independent combining/dividing network for each polarization, an independent voltage control circuit for each dielectrically tunable phase shifter, and an independent amplifier for each column of radiating elements. The amplifiers provide independent amplitude control of the radio frequency energy propagating through each column of the aperture.

Antennas constructed in accordance with this invention can also include an antenna controller comprising means for monitoring the signal to interference ratio of received signals, means for electronically steering the antenna beam, means for electronically adjusting the antenna beam width, a feedback loop that automatically adjusts the beam pointing angle of the antenna as required to maximize the signal to interference ratio of a received signal, and a feedback loop that automatically adjusts the beam width of the antenna as required to maximize the signal to interference ratio of a received signal.

A plurality of isolated combining/dividing networks can be connected in series with the antenna aperture. An independent set of electronically tunable phase shifters can be connected in series with each combining-dividing network. In addition, independent control circuitry can be provided for each phase shifter.

The antenna can further include a plurality of radiating elements receptive to both vertically polarized and horizontally polarized radio frequency energy, an independent combining/dividing network for each polarization, and an independent set of phase shifters in series with each combining dividing network.

Each aperture can be substantially planar in topology and can incorporate dielectrically tunable phase shifters. The antenna can further include combining/dividing networks comprised of radio frequency circuitry on a plurality of closely stacked, vertically disposed layers.

The control circuitry for the phase shifters and the voltage control lines connecting the phase shifters to the control circuitry can share a common carrier with an associated combining/dividing network.

DESCRIPTION OF THE PREFERRED EMBODIMENTS

Figure 1:
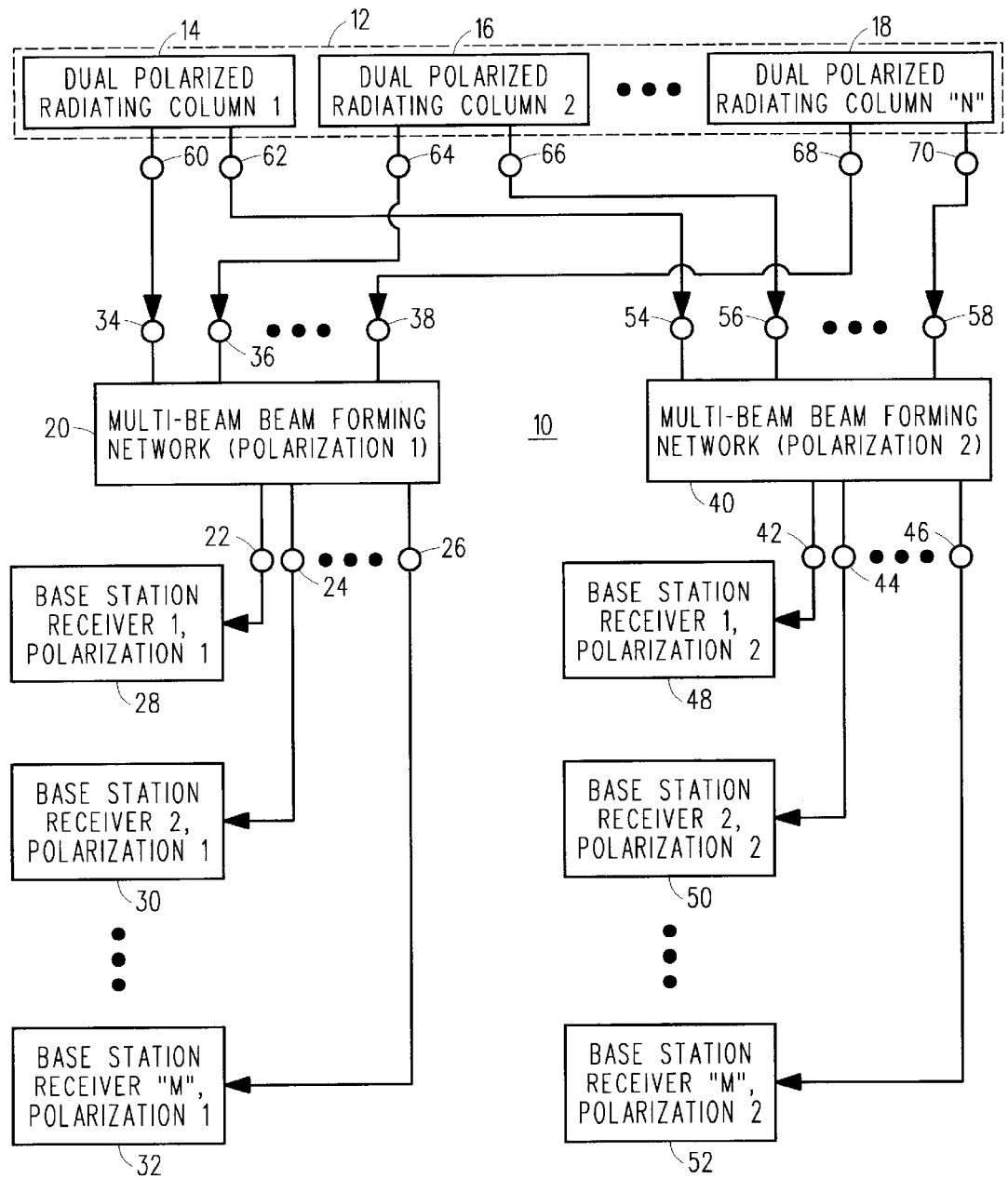
FIG. 1 is a block diagram of a one-dimensional scanning antenna capable of forming a first plurality of beams of a first polarization and a second plurality of beams of a second polarization, with all beams sharing the same aperture.

FIG. 1 is a block diagram of a one-dimensional scanning antenna 10 capable of forming a first plurality of beams of a first polarization and a second plurality of beams of a second polarization, with all beams sharing the same aperture. Antenna 10 includes an array of radiating elements 12 arranged in a plurality of columns 14, 16, 18 of dual polarized radiating elements. A first multi-beam forming network 20 has a plurality of output ports 22, 24, 26 for connection to a plurality of base station receivers 28, 30, 32. First multi-beam forming network 20 further includes a plurality of input ports 34, 36, 38 for connection to columns of radiating elements 14, 16, 18. A second multi-beam forming network 40 has a plurality of output ports 42, 44, 46 for connection to a plurality of base station receivers 48, 50, 52. Second multi-beam forming network 40 further includes a plurality of input ports 54, 56, 58 for connection to columns of radiating elements 14, 16, 18.

Each column 14, 16, 18 of dual polarized radiating elements includes two output ports. Column 14 includes output ports 60, 62. Column 16 includes output ports 64, 66. Column 18 includes output ports 68, 70. Output ports 60, 64, 68 are coupled to first beam-forming network 20. Output ports 62, 68, 70 are coupled to second beam-forming network 40.

Antenna 10 (FIG. 1) exploits polarization diversity as a means of mitigating signal fading. Antenna 10 is a multi-beam, receive only antenna that supports up to twelve independent, electronically scanning beams with variable, electronic beam width control. Half of the beams are of one polarization and half are of a different polarization. All the beams share a common aperture. The fact that antenna 10 supports two polarizations provides a means of exploiting polarization diversity to mitigate signal fading.

Figure 2:
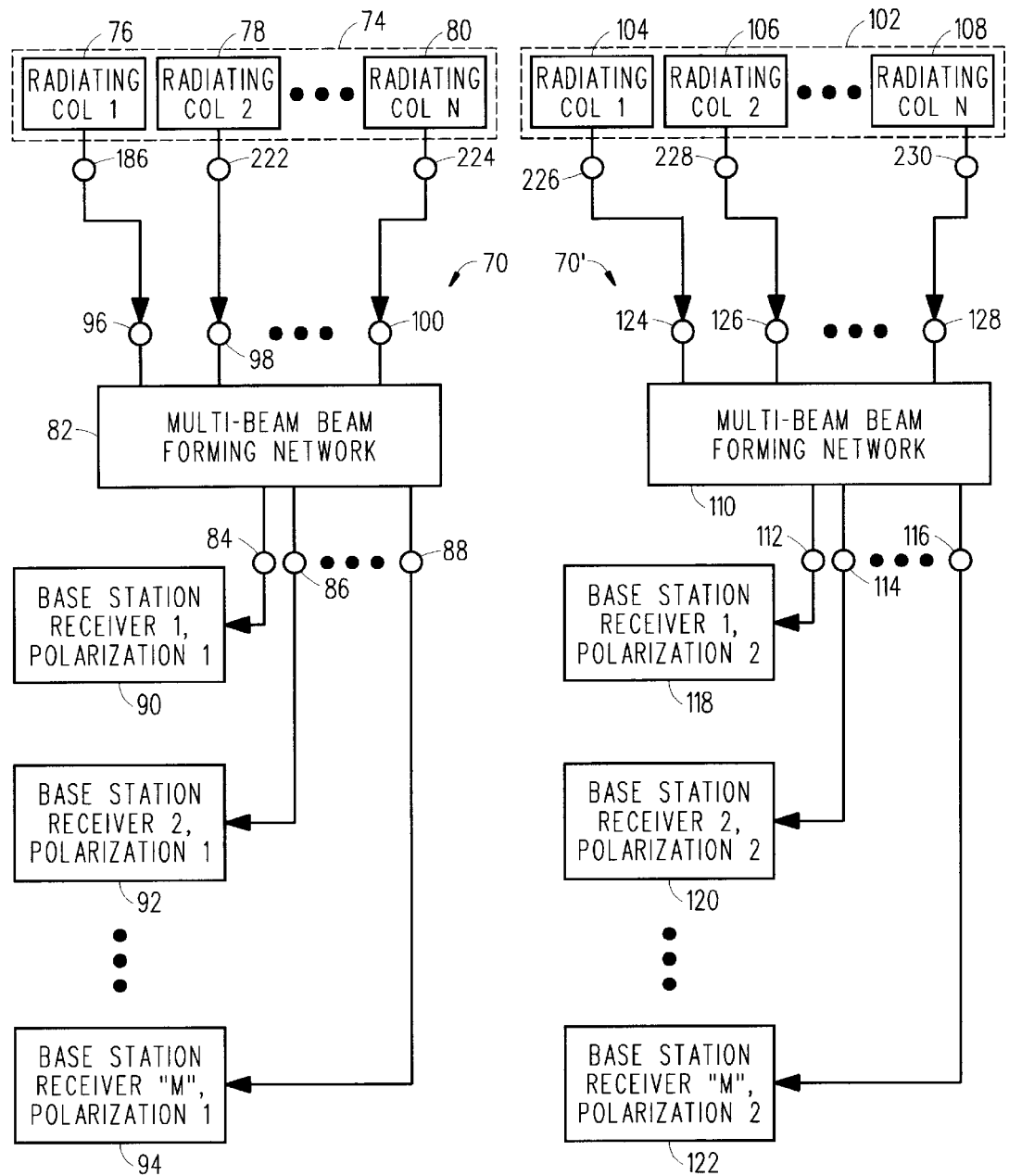
FIG. 2 is a block diagram of a pair of independent one-dimensional scanning antennas with each antenna being capable of forming a plurality of beams of a single polarization.

FIG. 2 is a block diagram of a pair of independent one-dimensional scanning antennas 70, 70' with each antenna 70, 70' being capable of forming a plurality of beams of a single polarization. Antenna 70 includes an array of radiating elements 74 arranged in a plurality of columns 76, 78, 80 of radiating elements. A multi-beam forming network 82 includes a plurality of output ports 84, 86, 88 for connection to a plurality of base station receivers 90, 92, 94 for receiving signals having a first polarization. Multi-beam forming network 82 further includes a plurality of input ports 96, 98, 100 for connection to columns of radiating elements 76, 78, 80. Antenna 70' includes an array of radiating elements 102 arranged in a plurality of columns 104, 106, 108 of radiating elements. A multi-beam forming network 110 includes a plurality of output ports 112, 114, 116 for connection to a plurality of base station receivers 118, 120, 122 for receiving signals having a first polarization. Multi-beam forming network 110 further includes a plurality of input ports 124, 126, 128 for connection to the columns of radiating elements 104, 106, 108. Columns 76, 78, 80 of radiating elements have output ports 186, 222, 224. Columns 104, 106, 108 of radiating elements have output ports 226, 228, 230.

Antennas 70, 70' of FIG. 2 exploit spatial diversity instead of polarization diversity as a means of mitigating signal fading.

Figure 3:
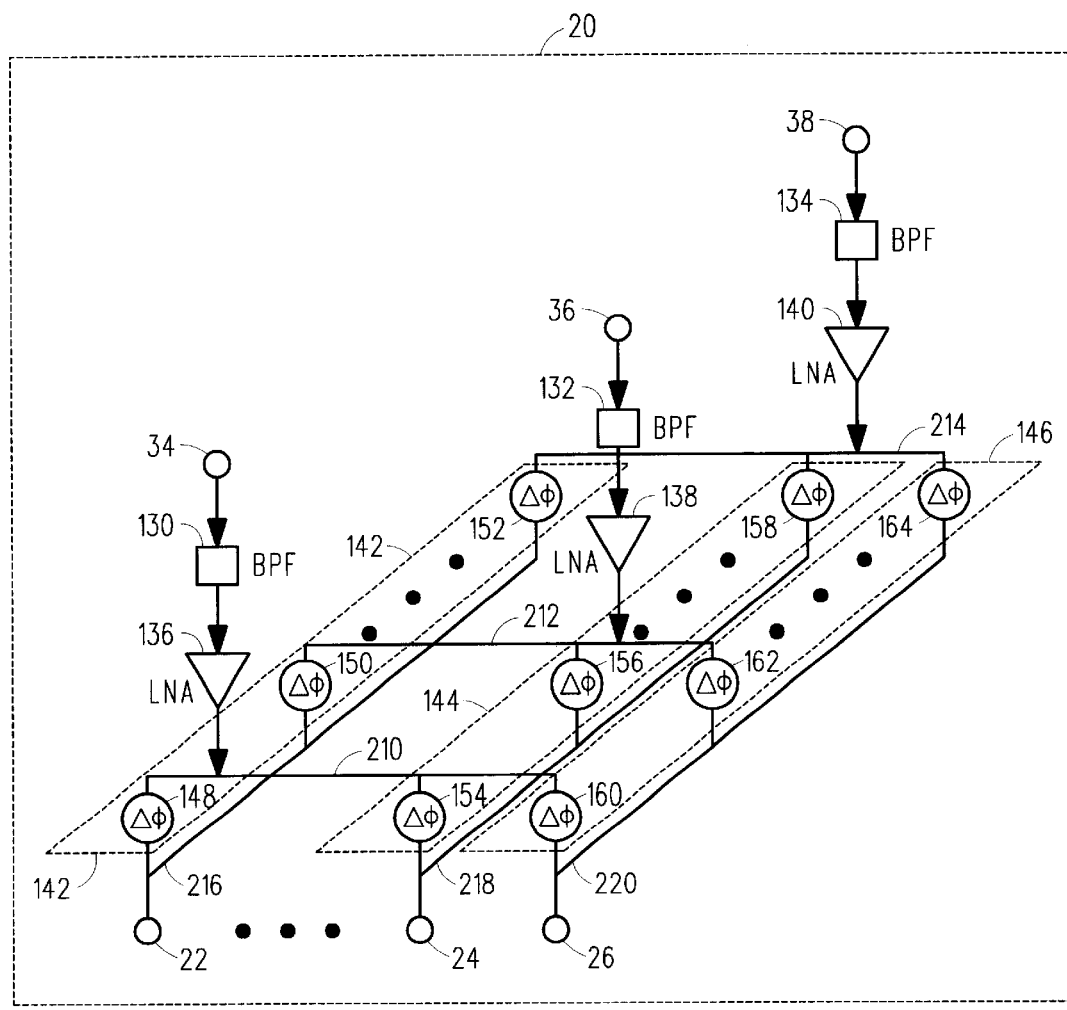
FIG. 3 is a schematic representation of the multi-beam beam-forming network that can be used in the antennas of FIGS. 1 and 2.

FIG. 3 is a schematic representation of the multi-beam beam-forming network 20 of antenna 10 (FIG. 1). Beam-forming network 20 includes a plurality of output ports 22, 24, 26 for connection to a plurality of base station receivers (e.g., base station receivers 28, 30, 32 in FIG. 1; not shown in FIG. 2) and a plurality of input ports 34, 36, 38 for connection to the columns of radiating elements 14, 16, 18. Band pass filters 130, 132, 134 are coupled to input ports 34, 36, 38. Low noise amplifiers 136, 138, 140 are connected in series with band pass filters 130, 132, 134. Beam-forming network 20 also includes a plurality of phase shifter manifolds 142, 144, 146. Low noise amplifiers 136, 138, 140 are connected to each of phase shifter manifolds 142, 144, 146 through splitters 210, 212, 214. Phase shifter manifolds 142, 144, 146 include a plurality of electronically tunable phase shifters 148, 150, 152, 154, 156, 158, 160, 162, 164. Phase shifters 148, 150, 152 in manifold 142 are connected to output port 22 through a combiner 216. Phase shifters 154, 156, 158 in manifold 144 are connected to output port 24 through a combiner 218. Phase shifters 160, 162, 164 in manifold 146 are connected to output port 26 through a combiner 220. Thus, manifolds 142, 144, 146 cooperate through splitters 210, 212, 214 and through combiners 216, 218, 220 to establish electronically tunable phase shifters 148, 150, 152, 154, 156, 158, 160, 162, 164 in a matrix permitting contribution by each of phase shifters 148, 150, 152, 154, 156, 158, 160, 162, 164 to affecting signals conveyed between input ports 34, 36, 38 and output ports 22, 24, 26 during transmission operations or during receiving operations. In the preferred embodiment, each electronically tunable phase shifter 148, 150, 152, 154, 156, 158, 160, 162, 164 includes a voltage tunable dielectric material having a dielectric constant that can be changed by applying an electric field to the material.

Figure 4:
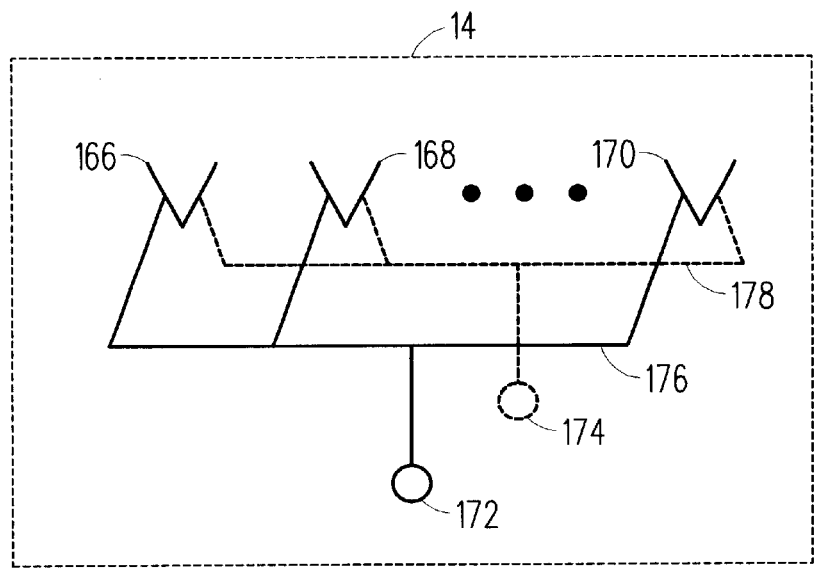
FIG. 4 is a schematic representation of the dual polarized radiating column that can be used in the antenna of FIG. 1.

FIG. 4 is a schematic representation of dual polarized radiating column 14 of antenna 10 (FIG. 1). Column 14 includes a plurality of dual polarized radiating elements 166, 168, 170, each coupled to output ports 172, 174 through a first elevation power combiner 176 and a second elevation power combiner 178. First elevation power combiner 176 is used for a first polarization, and second elevation power combiner 178 is used for a second polarization.

Figure 5:
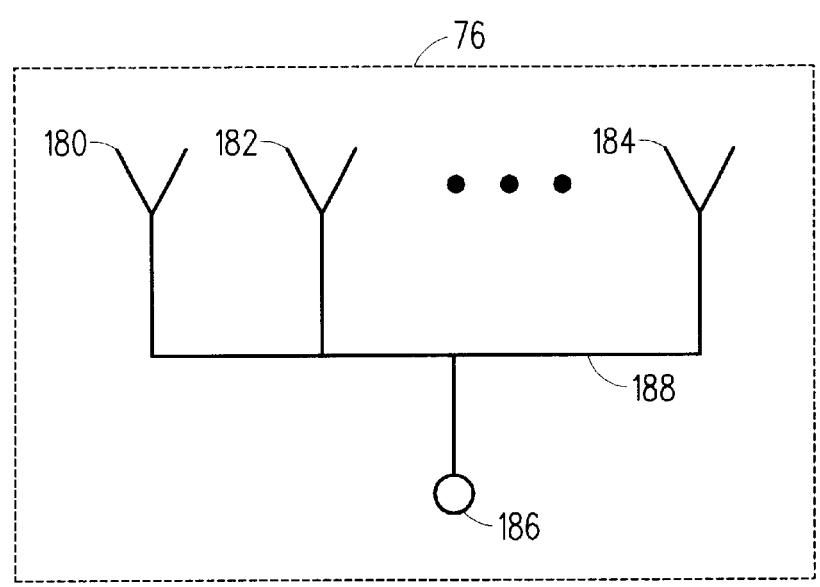
FIG. 5 is a schematic representation of the radiating column that can be used in the antenna of FIG. 2.

FIG. 5 is a schematic representation of radiating column 76 of antenna 70 (FIG. 2). Column 76 includes a plurality of dual polarized radiating elements 180, 182, 184, each coupled to an output port 186 through an elevation power combiner 188.

Figure 6:
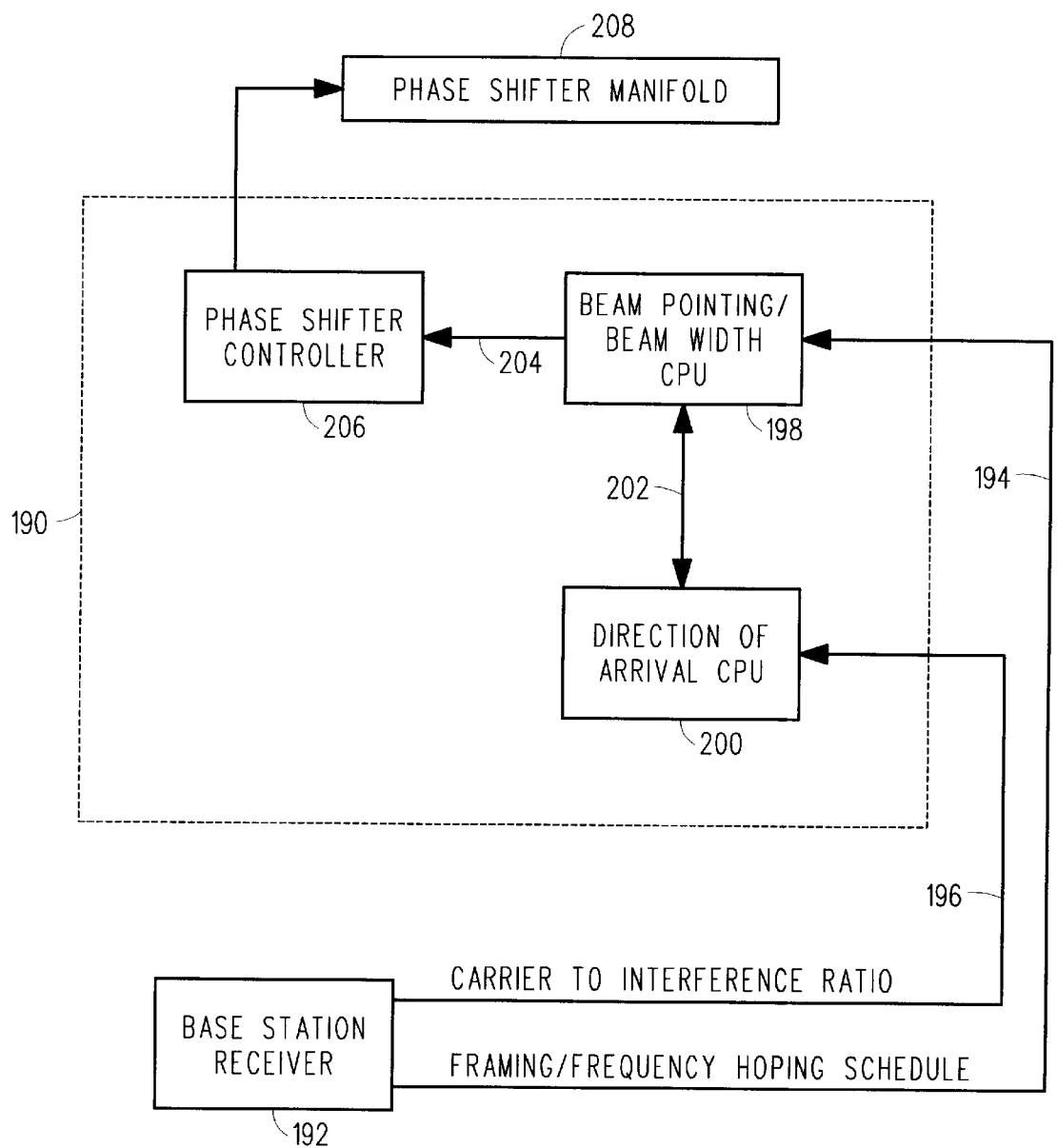
FIG. 6 is a block diagram of the control electronics associated with each independent beam of the multi-beam antennas of FIGS. 1 and 2.

FIG. 6 is a block diagram of a controller 190 associated with each independent beam of multi-beam antenna 10 (FIG. 1) or either of multi-beam antennas 70, 70' (FIG. 2). A base station receiver 192 (representing one of base station receivers 28, 30, 32, 48, 50, 52 in FIG. 1 or one of base station receivers 90, 92, 94, 118, 120, 122 in FIG. 2) produces a first signal on a line 194 that is representative of a framing/frequency hopping schedule of signals received by base station receiver 192. Base station receiver 192 also produces a second signal on a line 196 that is representative of carrier to interference (CI) ratio of signals received by base station receiver 192. Lines 194, 196 represent, by way of example and not by way of limitation, connections indicated by output ports 22, 24, 26, 42, 44, 46 (FIG. 1) or output ports 84, 86, 88, 112, 114, 116 (FIG. 2).

A beam pointing/beam width processor 198 receives the first signal representative of a framing/frequency hopping schedule on line 194. A direction of arrival processor 200 receives the second signal representative of CI ratio on line 196. Beam pointing/beam width processor 198 and direction of arrival processor 200 are connected through a data link 202. Beam pointing/beam width processor 198 produces a signal on data link 204 to a phase shift controller 206. In response to the data signal on data link 204, phase shift controller 206 delivers phase shift control signals to a phase shifter manifold 208 (representing one of phase shifter manifolds 142, 144, 146 in FIG. 3). Phase shifter manifold 208 contains respective tunable phase shifters (not shown in FIG. 6) such as tunable phase shifters 148, 150, 152, 154, 156, 158, 160, 162, 164 (FIG. 3). When phase shifters 148, 150, 152, 154, 156, 158, 160, 162, 164 use voltage tunable dielectric material, the phase shifter control signals from phase shift controller 206 can be DC bias voltages that control the dielectric constant of the voltage tunable dielectric material.

Antenna 10 (FIG. 1) is a one-dimensional electronic scanning, dual polarized, multi-beam antenna for servicing multi-user wireless applications that uses a modular design to accommodate flexible, time-phased deployment. Low cost dielectrically tunable phase shifters control electronic scanning of multiple narrow beams offering increased gain relative to fixed beam antennas and spatial discrimination as provided by more costly digital beam forming techniques. Each modular antenna 10 in an array preferably includes columns of dual polarized patch radiators with each polarization being fed by an independent bank of phase shifters. The modular design accommodates an array of multiple independent apertures with each aperture capable of radiating up to two independent beams. Two banks of low cost, dielectrically tunable, planar phase shifters can be advantageously integrated into a low profile, multi-layer corporate feed network for each aperture.

Exemplary electronic phase shifters that include tunable dielectric material are disclosed in U.S. patent application Ser. Nos. 09/644,019 (PCT/US00/23023), 09/660,719 (PCT/US00/25016), 09/838,483 (PCT/US01/12722), and 09/847,254. These applications are assigned to the assignee of the present application, and are hereby incorporated by reference.

The one-dimensional, electronically scanned, multi-beam antennas of this invention are useful to enhance the quality and capacity of multi-user wireless networks. Multiple banks of low cost dielectrically tunable phase shifters control electronic scanning of multiple narrow beams offer increased gain and improved interference rejection compared to broader beam fixed antennas. Built-in electronic beam width control further enhances the ability of the antenna to maximize signal to interference ratio. Antenna 10 (FIG. 1) preferably incorporates dual polarized radiators to exploit polarization diversity to help minimize signal fading. Built-in hardware permits the antenna to monitor the carrier to interference (CI) ratio of a received signal in real time. This information may be used to automatically adjust the beam pointing angle and beam width as required to continuously maximize the CI ratio.

Antenna 10 (FIG. 1) preferably incorporates multiple dual polarized beams into a single aperture. Each beam in a polarized pair is independently steerable. In addition, the beam width of each beam can be controlled electronically to respond to changing degrees of angular signal spreading in real time. By simultaneously optimizing the beam pointing angle and the beam width, significantly better CI ratios can be achieved. Such improvements in CI ratio can be translated into improvements in communication quality and/or increased network capacity. Antenna 10 (FIG. 1) and antennas 70, 70' (FIG. 2) are preferably configured with control electronics of the sort illustrated in FIG. 6 to enable a respective antenna 10, 70, 70' to monitor and respond to changing signal conditions and automatically optimize CI ratio in real time.

To control the beam pointing angle, each phase shifter 148, 150, 152, 154, 156, 158, 160, 162, 164 is adjusted as required to establish a linear phase gradient across the radiating aperture. An aperture includes multiple columns of radiating elements (e.g., columns 14, 16, 18 in FIG. 1 or columns 76, 78, 80, 104, 106, 108 in FIG. 2). Thus, an aperture may include all or a portion of a radiating element, such as radiating element 12 (FIG. 1). Preferably, an aperture includes all of a radiating element; control arrangements are simpler using such a construction. The phase of the RF energy at the radiating face of each column in an aperture must be adjusted (by a phase shifter associated with that column) so that the difference in phase (also referred to as the phase delta, or Δ phase) relative to an adjacent column (e.g., a Δ phase to the left) is proportional to a desired beam scan angle. In other words, the phase of each column in an aperture is adjusted so that a constant Δ phase exists from one column to the next adjacent column across the array face. The beam scanning angle is proportional to this constant Δ phase between columns. The Δ phase from one column to the next will always be between 0 and 360 degrees. The total Δ phase from one end of the array to the other end of the array (that is, for example, from the left-most column to the right-most column) can be thousands of degrees for scan angles such as 45 or 60 degrees.

To control beam width, multiple phase shifters may be selected and tuned to phase shift values offset from the ideal values used to form a narrow beam. Proper phase shifter selection and proper phase offset values required to achieve a desired beam width are typically established under laboratory conditions using measurement feedback and then applied globally. The technique of adjusting several phase shifters to non-ideal values is sometimes referred to as "spoiling" the beam. By adjusting several selected phase shifters to non-ideal phase shift values an otherwise narrow beam will become defocused, or spoiled, as a result of disrupting the linear phase gradient across the aperture face. The non-ideal phase gradient results in some RF energy being radiated (or received) in (or from) directions other than the otherwise intended beam pointing direction. Such scattered energy results in a net broadening of the beam. Width of the beam can be controlled to a useable degree by selectively interjecting phase offsets as described above.

In principle, any phase shifting device tuned to the proper frequency and providing at least 360 degrees of phase shift is suitable for accomplishing beam steering and beam width control. However, in practice, many factors make the tunable dielectric phase shifters of the present invention advantageous. These factors include lower cost, higher speed, lower power consumption, smaller size, and lesser weight of tunable dielectric phase shifters as compares with other phase shifter devices.

Tunable dielectric phase shifters are low cost because their associated fabrication processes can yield multiple tunable elements in a parallel fashion on a single substrate. For applications where fast switching is important, tunable dielectric phase shifters offer switching speeds 10 times faster than conventional ferrite phase shifters. Dielectrically tunable phase shifters draw comparatively low current (measured in micro amps) and thus require comparatively low switching power. Because the dielectric constant of tunable dielectric materials is high relative to ferrite (for example), tunable dielectric phase shifters are smaller and lighter leading to more compact packaging options than are attainable with phase shifters employing ferrite components.

The present invention provides a multi-beam antenna comprising a plurality of one dimensional, electronically scanning apertures, with each of the apertures including a plurality of radiating elements receptive to both vertically polarized and horizontally polarized radio frequency energy, an independent bank of dielectrically tunable phase shifters coupled to the radiating elements for each polarization, an independent combining/dividing network for each polarization, and an independent voltage control circuit for each dielectrically tunable phase shifter.

Each of the apertures can include means for connection to a neighboring aperture. Each of the apertures in the array can operate simultaneously while any other set of apertures in the same array is operating. The apertures can operate in the 1 to 2 GHz frequency band servicing mobile communications subscribers. In one embodiment, each of the apertures is substantially planar in topology. The apertures can include a combining/dividing network comprising radio frequency circuitry on a plurality of closely stacked, vertically disposed layers.

The tunable dielectric phase shifters, the control circuitry for the phase shifters and the voltage control lines connecting the phase shifters to the control circuitry can share a common carrier with the associated combining/dividing network.

In another embodiment, the invention provides a multi-beam antenna comprising a plurality of electronically scanning apertures, each of the apertures including a plurality of radiating elements, an independent bank of tunable dielectric phase shifters, and at least one combining/dividing network. An independent voltage control circuit is provided for each tunable dielectric phase shifter. An independent central processing unit is preferably provided for computing phase shifter control commands as required to realize desired electronic beam steering.

In another aspect the invention provides a multi-beam antenna with centralized beam computational hardware comprising a plurality of one dimensional, electronically scanning apertures, each of the apertures including a plurality of radiating elements receptive to both vertically polarized and horizontally polarized radio frequency energy. An independent bank of tunable dielectric phase shifters and an independent combining/dividing network are provided for each polarization. An independent voltage control circuit is preferably provided for each dielectrically tunable phase shifter. An independent amplifier is preferably used for each column of radiating elements.

The antenna of the present invention can include a means for monitoring the carrier to interference ratio of received signals, means for electronically steering the antenna beam, means for electronically adjusting the antenna beam width, a feedback loop that automatically adjusts the beam pointing angle of the antenna as required to maximize the carrier to interference ratio of a received signal, and a feedback loop that automatically adjusts the beam width of the antenna as required to maximize the carrier to interference ratio of a received signal.

A plurality of isolated combining/dividing networks can be provided in series with the antenna aperture. An independent set of electronically tunable phase shifters can be connected in series with each combining-dividing network, and independent control circuitry can be provided for each phase shifter.

The plurality of radiating elements can be receptive to both vertically polarized and horizontally polarized radio frequency energy. An independent combining/dividing network can be used for each polarization.

An independent set of phase shifters can be connected in series with each combining-dividing network. A low noise amplifier can be used for each column of radiating elements. A band pass filter can be connected in series with each low noise amplifier. The amplifiers provide independent amplitude control of the radio frequency energy propagating through each column of the aperture.

Each aperture can be substantially planar in topology and can incorporate dielectrically tunable phase shifters. The antenna can further include combining/dividing networks comprised of radio frequency circuitry on a plurality of closely stacked, vertically disposed layers.

The control circuitry for the phase shifters and the voltage control lines connecting the phase shifters to the control circuitry can share a common carrier with an associated combining/dividing network.

The phase shifters in the preferred embodiment of the invention include a tunable dielectric material. Tunable dielectric materials have been described in several patents. Barium strontium titanate ($BaTiO_3$-$SrTiO_3$), also referred to as BSTO, is used for its high dielectric constant (200-6,000) and large change in dielectric constant with applied voltage (25-75 percent with a field of 2 Volts/micron). Tunable dielectric materials including barium strontium titanate are disclosed in U.S. Pat. No. 5,427,988 by Sengupta, et al. entitled "Ceramic Ferroelectric Composite Material-BSTO-MgO"; U.S. Pat. No. 5,635,434 by Sengupta, et al. entitled "Ceramic Ferroelectric Composite Material-BSTO-Magnesium Based Compound"; U.S. Pat. No. 5,830,591 by Sengupta, et al. entitled "Multilayered Ferroelectric Composite Waveguides"; U.S. Pat. No. 5,846,893 by Sengupta, et al. entitled "Thin Film Ferroelectric Composites and Method of Making"; U.S. Pat. No. 5,766,697 by Sengupta, et al. entitled "Method of Making Thin Film Composites"; U.S. Pat. No. 5,693,429 by Sengupta, et al. entitled "Electronically Graded Multilayer Ferroelectric Composites"; U.S. Pat. No. 5,635,433 by Sengupta entitled "Ceramic Ferroelectric Composite Material BSTO-ZnO"; U.S. Pat. No. 6,074,971 by Chiu et al. entitled "Ceramic Ferroelectric Composite Materials with Enhanced Electronic Properties BSTO-Mg Based Compound-Rare Earth Oxide". These patents are hereby incorporated by reference.

The electronically tunable materials that can be used in the phase shifters used in the preferred embodiments of the present invention can include at least one electronically tunable dielectric phase, such as barium strontium titanate, in combination with at least two additional metal oxide phases. Barium strontium titanate of the formula $Ba_xSr_{1-x}TiO_3$ is a preferred electronically tunable dielectric material due to its favorable tuning characteristics, low Curie temperatures and low microwave loss properties. In the formula $Ba_xSr_{1-x}TiO_3$, x can be any value from 0 to 1, preferably from about 0.15 to about 0.6. More preferably, x is from 0.3 to 0.6.

Other electronically tunable dielectric materials may be used partially or entirely in place of barium strontium titanate. An example is $Ba_xCa_{1-x}TiO_3$, where x is in a range from about 0.2 to about 0.8, preferably from about 0.4 to about 0.6. Additional electronically tunable ferroelectrics include $Pb_xZr_{1-x}TiO_3$ (PZT) where x ranges from about 0.0 to about 1.0, $Pb_xZr_{1-x}SrTiO_3$ where x ranges from about 0.05 to about 0.4, $KTa_xNb_{1-x}O_3$ where x ranges from about 0.0 to about 1.0, lead lanthanum zirconium titanate (PLZT), $PbTiO_3$, $BaCaZrTiO_3$, $NaNO_3$, $KNbO_3$, $LiNbO_3$, $LiTaO_3$, $PbNb_2O_6$, $PbTa_2O_6$, $KSr(NbO_3)$ and $NaBa_2(NbO_3)_5KH_2PO_4$, and mixtures and compositions thereof. Also, these materials can be combined with low loss dielectric materials, such as magnesium oxide (MgO), aluminum oxide ($Al_2O_3$), and zirconium oxide ($ZrO_2$), and/or with additional doping elements, such as manganese (MN), iron (Fe), and tungsten (W), or with other alkali earth metal oxides (i.e. calcium oxide, etc.), transition metal oxides, silicates, niobates, tantalates, aluminates, zirconnates, and titanates to further reduce the dielectric loss.

In addition, the following U.S. patent applications, assigned to the assignee of this application, disclose additional examples of tunable dielectric materials: U.S. application Ser. No. 09/594,837 filed Jun. 15, 2000, entitled "Electronically Tunable Ceramic Materials Including Tunable Dielectric and Metal Silicate Phases"; U.S. application Ser. No. 09/768,690 filed Jan. 24, 2001, entitled "Electronically Tunable, Low-Loss Ceramic Materials Including a Tunable Dielectric Phase and Multiple Metal Oxide Phases"; U.S. application Ser. No. 09/882,605 filed Jun. 15, 2001, entitled "Electronically Tunable Dielectric Composite Thick Films And Methods Of Making Same"; U.S. application Ser. No. 09/621,183 filed Apr. 13, 2001, entitled "Strain-Relieved Tunable Dielectric Thin Films"; and U.S. Provisional Application Serial No. 60/295,046 filed Jun. 1, 2001 entitled "Tunable Dielectric Compositions Including Low Loss Glass Frits".

The tunable dielectric materials can also be combined with one or more non-tunable dielectric materials. The non-tunable phase(s) may include MgO, $MgAl_2O_4$, $MgTiO_3$, $Mg_2SiO_4$, $CaSiO_3$, $MgSrZrTiO_6$, $CaTiO_3$, $Al_2O_3$, $SiO_2$ and/or other metal silicates such as $BaSiO_3$ and $SrSiO_3$. The non-tunable dielectric phases may be any combination of the above, e.g., MgO combined with $MgTiO_3$, MgO combined with $MgSrZrTiO_6$, MgO combined with $Mg_2SiO_4$, MgO combined with $Mg_2SiO_4$, $Mg_2SiO_4$ combined with $CaTiO_3$ and the like.

Additional minor additives in amounts of from about 0.1 to about 5 weight percent can be added to the composites to additionally improve the electronic properties of the films. These minor additives include oxides such as zirconnates, tannates, rare earths, niobates and tantalates. For example, the minor additives may include $CaZrO_3$, $BaZrO_3$, $SrZrO_3$, $BaSnO_3$, $CaSnO_3$, $MgSnO_3$, $Bi_2O_3/2SnO_2$, $Nd_2O_3$, $Pr_7O_{11}$, $Yb_2O_3$, $Ho_2O_3$, $La_2O_3$, $MgNb_2O_6$, $SrNb_2O_6$, $BaNb_2O_6$, $MgTa_2O_6$, $BaTa_2O_6$ and $Ta_2O_3$.

Thick films of tunable dielectric composites can comprise $Ba_{1-x}Sr_xTiO_3$, where x is from 0.3 to 0.7 in combination with at least one non-tunable dielectric phase selected from MgO, $MgTiO_3$, $MgZrO_3$, $MgSrZrTiO_6$, $Mg_2SiO_4$, $CaSiO_3$, $MgAl_2O_4$, $CaTiO_3$, $Al_2O_3$, $SiO_2$, $BaSiO_3$ and $SrSiO_3$. These compositions can be BSTO and one of these components or two or more of these components in quantities from 0.25 weight percent to 80 weight percent with BSTO weight ratios of 99.75 weight percent to 20 weight percent.

The electronically tunable materials can also include at least one metal silicate phase. The metal silicates may include metals from Group 2A of the Periodic Table, i.e., Be, Mg, Ca, Sr, Ba and Ra, preferably Mg, Ca, Sr and Ba. Preferred metal silicates include $Mg_2SiO_4$, $CaSiO_3$, $BaSiO_3$ and $SrSiO_3$. In addition to Group 2A metals, the present metal silicates may include metals from Group 1A, i.e., Li, Na, K, Rb, Cs and Fr, preferably Li, Na and K. For example, such metal silicates may include sodium silicates such as $Na_2SiO_3$ and $NaSiO_3$-$5H_2O$, and lithium-containing silicates such as $LiAlSiO_4$, $Li_2SiO_3$ and $Li_4SiO_4$. Metals from Groups 3A, 4A and some transition metals of the Periodic Table may also be suitable constituents of the metal silicate phase. Additional metal silicates may include $Al_2Si_2O_7$, $ZrSiO_4$, $KalSi_3O_8$, $NaAlSi_3O_8$, $CaAl_2Si_2O_8$, $CaMgSi_2O_6$, $BaTiSi_3O_9$ and $Zn_2SiO_4$. The above tunable materials can be tuned at room temperature by controlling an electric field that is applied across the materials.

In addition to the electronically tunable dielectric phase, the electronically tunable materials can include at least two additional metal oxide phases. The additional metal oxides may include metals from Group 2A of the Periodic Table, i.e., Mg, Ca, Sr, Ba, Be and Ra, preferably Mg, Ca, Sr and Ba. The additional metal oxides may also include metals from Group 1A, i.e., Li, Na, K, Rb, Cs and Fr, preferably Li, Na and K. Metals from other Groups of the Periodic Table may also be suitable constituents of the metal oxide phases. For example, refractory metals such as Ti, V, Cr, Mn, Zr, Nb, Mo, Hf, Ta and W may be used. Furthermore, metals such as Al, Si, Sn, Pb and Bi may be used. In addition, the metal oxide phases may comprise rare earth metals such as Sc, Y, La, Ce, Pr, Nd and the like.

The additional metal oxides may include, for example, zirconnates, silicates, titanates, aluminates, stannates, niobates, tantalates and rare earth oxides. Preferred additional metal oxides include $Mg_2SiO_4$, MgO, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, PbO, $Bi_2O_3$ and $La_2O_3$. Particularly preferred additional metal oxides include $Mg_2SiO_4$, MgO, $CaTiO_3$, $MgZrSrTiO_6$, $MgTiO_3$, $MgAl_2O_4$, $MgTa_2O_6$ and $MgZrO_3$.

The additional metal oxide phases are typically present in total amounts of from about 1 to about 80 weight percent of the material, preferably from about 3 to about 65 weight percent, and more preferably from about 5 to about 60 weight percent. In one preferred embodiment, the additional metal oxides comprise from about 10 to about 50 total weight percent of the material. The individual amount of each additional metal oxide may be adjusted to provide the desired properties. Where two additional metal oxides are used, their weight ratios may vary, for example, from about 1:100 to about 100:1, typically from about 1:10 to about 10:1 or from about 1:5 to about 5:1. Although metal oxides in total amounts of from 1 to 80 weight percent are typically used, smaller additive amounts of from 0.01 to 1 weight percent may be used for some applications.

In one embodiment, the additional metal oxide phases may include at least two Mg-containing compounds. In addition to the multiple Mg-containing compounds, the material may optionally include Mg-free compounds, for example, oxides of metals selected from Si, Ca, Zr, Ti, Al and/or rare earths. In another embodiment, the additional metal oxide phases may include a single Mg-containing compound and at least one Mg-free compound, for example, oxides of metals selected from Si, Ca, Zr, Ti, Al and/or rare earths.

To construct a tunable device, the tunable dielectric material can be deposited onto a low loss substrate. In some instances, such as where thin film devices are used, a buffer layer of tunable material, having the same composition as a main tunable layer, or having a different composition can be inserted between the substrate and the main tunable layer. The low loss dielectric substrate can include magnesium oxide (MgO), aluminum oxide ($Al_2O_3$), and lanthium oxide ($LaAl_2O_3$).

While the present invention has been described in terms of what are at present believed to be its preferred embodiments, it will be apparent to those skilled in the art that various changes can be made to the disclosed embodiments without departing form the invention as defined by the following claims.

We claim:

1. An apparatus for employment in an antenna system configured for beam scanning operation; the apparatus comprising:
    (a) a plurality of antenna elements; said plurality of antenna elements being arranged in a plurality of element sets arrayed in a plurality of columns; each respective column of said plurality of columns including at least one said element set of said plurality of element sets; each respective element set of said plurality of element sets including at least one respective antenna element of said plurality of antenna elements;
    (b) a plurality of beam forming network devices; each respective beam forming network device of said plurality of beam forming network devices being coupled with each said respective antenna element of at least one said respective element set in at least one said respective column; each said respective beam forming network including a plurality of voltage tunable dielectric phase shifter units; said plurality of voltage tunable dielectric phase shifter units being arranged in a matrix permitting contribution by each respective voltage tunable dielectric phase shifter of said plurality of voltage tunable dielectric phase shifters to affect signals traversing the apparatus; and
    (c) at least one control unit coupled with said plurality of beam forming network devices and with selected antenna elements of said plurality of antenna elements; said at least one control unit controlling operation of said plurality of beam forming network devices for configuring signals coupled with said respective antenna elements to effect said beam scanning operation; said at least one control unit monitoring received signals at said selected antenna elements to ascertain a signal-to-interference measure for said received signals; said at least one control unit effecting said configuring to substantially maximize said signal-to-interference measure.

2. An apparatus for employment in an antenna system configured for beam scanning operation as recited in claim 1 wherein each said respective column is coupled with a single said respective beam forming network device.

3. An apparatus for employment in an antenna system configured for beam scanning operation as recited in claim 2 wherein each said respective beam forming network device configures a respective said signal coupled with a respective said antenna element by configuring phase of said respective signal.

4. An apparatus for employment in an antenna system configured for beam scanning operation as recited in claim 3 wherein said phase is configured by varying electrical potential across selected voltage tunable dielectric phase shifters of said plurality of voltage tunable dielectric phase shifters.

5. An apparatus for employment in an antenna system configured for beam scanning operation as recited in claim 1 wherein each said respective column is coupled with a plurality of said respective beam forming network devices.

6. An apparatus for employment in an antenna system configured for beam scanning operation as recited in claim 5 wherein each said respective beam forming network device configures a respective said signal coupled with a respective said antenna element by configuring phase of said respective signal.

7. An apparatus for employment in an antenna system configured for beam scanning operation as recited in claim 6 wherein said phase is configured by varying electrical potential across selected voltage tunable dielectric phase shifters of said plurality of voltage tunable dielectric phase shifters.

8. An electronic scanning antenna system configured for beam scanning operation and including a plurality of antenna modules; each respective antenna module of said plurality of antenna modules comprising:
    (a) a plurality of antenna elements arranged in a plurality of element sets; said plurality of element sets being arranged in a plurality of columns;
    (b) a plurality of beam forming network devices coupled with said plurality of antenna elements; each respective beam forming network device of said plurality of beam forming network devices including at least one voltage tunable dielectric phase shifter unit; and
    (c) at least one control unit coupled with said plurality of beam forming network devices and with said plurality of antenna elements; said at least one control unit controlling said plurality of beam forming network devices for configuring signals to operate said plurality of antenna elements to effect said beam scanning operation; said at least one control unit monitoring received signals at said plurality of antenna elements to ascertain a signal-to-interference measure for said received signals; said at least one control unit effecting said configuring to substantially maximize said signal-to-interference measure.

9. An apparatus for employment in an antenna system configured for beam scanning operation as recited in claim 8 wherein each respective column of said plurality of columns is coupled with a respective said beam forming network device.

10. An apparatus for employment in an antenna system configured for beam scanning operation as recited in claim 9 wherein each said respective beam forming network device configures a respective said signal coupled with a respective said antenna element by configuring phase of said respective signal.

11. An apparatus for employment in an antenna system configured for beam scanning operation as recited in claim 10 wherein said phase is configured by varying electrical potential across selected voltage tunable dielectric phase shifters of said at least one voltage tunable dielectric phase shifter.

12. An apparatus for employment in an antenna system configured for beam scanning operation as recited in claim 8 wherein each said respective column is coupled with a plurality of said respective beam forming network devices.

13. An apparatus for employment in an antenna system configured for beam scanning operation as recited in claim 12 wherein each said respective beam forming network device configures a respective said signal coupled with a respective said antenna element by configuring phase of said respective signal.

14. An apparatus for employment in an antenna system configured for beam scanning operation as recited in claim 13 wherein said phase is configured by varying electrical potential across selected voltage tunable dielectric phase shifters of said plurality of voltage tunable dielectric phase shifters.

* * * * *